United States Patent [19]

Kirk

[11] Patent Number: 4,667,408
[45] Date of Patent: May 26, 1987

[54] WATER CLEANED VEGETABLE PEELER

[76] Inventor: Norbert A. Kirk, 1458 W. Belle Plaine, Chicago, Ill. 60613

[21] Appl. No.: 793,282

[22] Filed: Oct. 31, 1985

[51] Int. Cl.$^4$ ............................................. B26B 1/02
[52] U.S. Cl. ...................................... 30/123.3; 30/136
[58] Field of Search ....................... 30/123.3, 136, 41.5

[56] References Cited

U.S. PATENT DOCUMENTS 1,598,811  9/1926  Ferrin ............................. 30/41.5 X
3,143,984  8/1964  Morasch ........................... 30/123.3

Primary Examiner—Douglas D. Watts
Attorney, Agent, or Firm—Larson and Taylor

[57] ABSTRACT

A water cleaned vegetable peeler includes a handle with a bearing member mounted therein. The bearing member is mounted for oscillatory motion at one end of the handle and an elongate peeling blade is mounted by a mounting end to the bearing member. A passage is provided through the mounting end of the peeling blade, through the bearing member, to a hose which is suitably connected to a source of water such as a faucet. Thus, when peeling a vegetable, the peels are washed longitudinally away from the blade and out of the way so further peeling can proceed. Preferably, the peeling blade is replaceable and the bearing member is mounted for oscillatory motion only.

10 Claims, 5 Drawing Figures

U.S. Patent    May 26, 1987    4,667,408
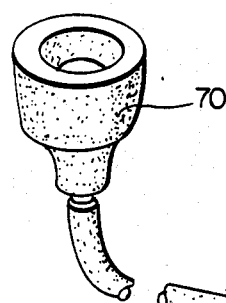
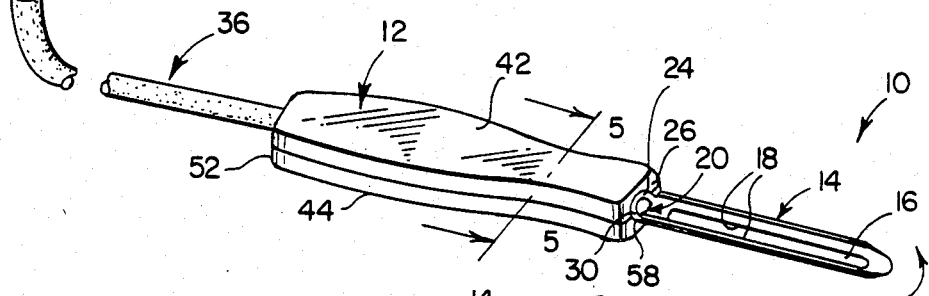
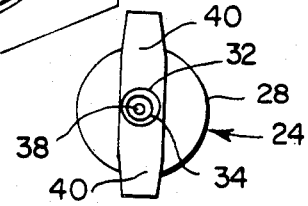
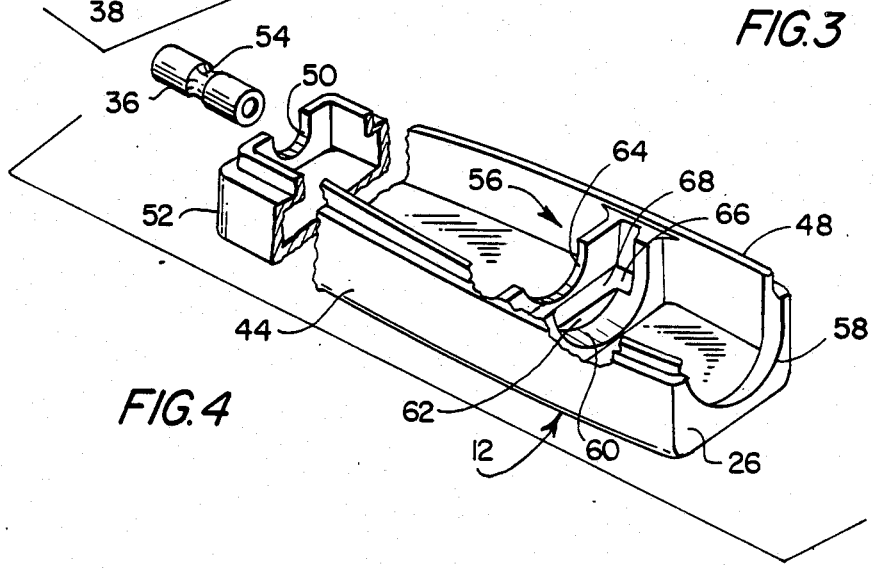
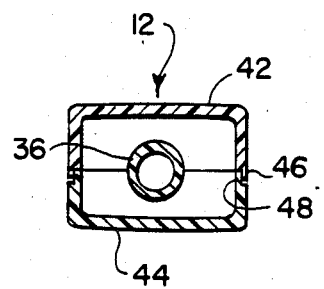
FIG. 1
FIG. 2
FIG. 3
FIG. 4
FIG. 5

WATER CLEANED VEGETABLE PEELER

FIELD OF THE INVENTION invention relates generally to vegetable peelers, and more particularly to a vegetable peeler in which the peeling blade is automatically cleaned by flowing water.

BACKGROUND OF THE INVENTION

Many types of vegetable peelers have been disclosed in the prior art for peeling vegetables such as potatoes, carrots, or the like. In addition, the use of such vegetable peelers under a running faucet is also common. However, due to the problem of handling the vegetable and vegetable peeler during peeling, it is difficult to maintain the vegetable peeler during the peeling operation under the running faucet. In addition, as the vegetable peeler is located beneath the running faucet, the direction of the running water (downwards) actually opposes the movement of the peelings (upward). Thus, prior art vegetable peelers have been subject to clogging of the space between the opposed blades even while operated under a running faucet.

There has also been disclosed in U.S. Pat. No. 2,656,600 (Barbee), a water cleaning paring knife. Disclosed in this patent is a paring knife with a blade and a handle. The handle includes a longitudinal passage for water which discharges upon the blade as the vegetables are pared. This paring knife includes a conduit which is adapted to be coupled to a water faucet.

Various other cutting tools which include a means for depositing a liquid on the cutting blade have also been disclosed in the prior art. For example, in U.S. Pat. No. 1,628,315 (Hamilton), a cutting tool for cutting tread designs in rubber tires is disclosed including a tube supplied with a water and soap solution which is conveyed to the cutting edge for purposes of cooling and lubrication. A glass cutting tool containing a supply of lubricating oil stored in the barrel of the tool which is conducted to the cutting blade is disclosed in U.S. Patent No. 4,287,669 (Arai). A cutting implement for rubber or other materials which also has a fluid reservoir for continuously applying a fluid to the blade is also disclosed in U.S. Pat. No. 2,042,965 (Rivard).

Also disclosed in the prior art is a water powered flexible peeler which allows the water to flow over the blades to wash the peelings clear. Such a device is disclosed in U.S. Pat. No. 4,211,002 (Kirk).

SUMMARY OF THE INVENTION

In accordance with the present invention, a water cleaning vegetable peeler is provided. The vegetable peeler includes a handle having a front end and a back end. A bearing member is also provided having an aperture extending from the front end to the back end along the longitudinal axis. A mounting means is then provided for mounting the bearing member for oscillatory movement around the longitudinal axis in the front end of the handle. A peeling blade including a mounting end is provided for the vegetable peeler. The mounting end of the peeling blade is adapted to fit in the aperture of the bearing member and the mounting end includes an aperture therethrough. A water supply means supplies water to the peeling blade through the aperture in the mounting end of the peeling blade. The water supply means includes an adapter for attachment to a water faucet and a hose which is attached to the adapter at one end and to the back end of the bearing member at the other end. With the present invention, as a vegetable is being peeled, water is supplied axially along the peeling blade to push the vegetable peelings away from the blade and thus keep the blade clean.

In the preferred embodiment of the present invention, the mounting end of the peeling blade is received in only a portion of the aperture in the bearing member, and the remainder of the aperture in the bearing member is sized essentially the same as the aperture in the peeling blade. In addition, the mounting of the peeling blade is sized substantially the same as a portion of the aperture in the bearing member in which the mounting end of the blade is received so that the mounting end of the peeling blade is frictionally held therein. By this construction, the peeling blade is thus easily replaceable with a new blade.

In accordance with the present invention, the back end of the handle includes an aperture through which the hose entends. In addition, a means for preventing the hose from being pulled from the handle is also provided.

According to the preferred embodiment of the present invention, the front end of the bearing member is cylindrical and the back end of the bearing member is cylindrical as well. The mounting means then includes a front cylindrical surface for the front end of the bearing member and a back cylindrical bearing surface for the back end of the bearing member. A stop means is provided for limiting the oscillatory motion of the bearing element relative to the handle. Preferably, the stop means is located between the front cylindrical bearing surface and the back cylindrical bearing surface. The stop means preferably includes a pair of projections on opposite sides of the bearing member and a pair of stops for respective projections on the mounting means with each projection being located between respective pair of stops.

It is an advantage of the present invention that the peelings from the vegetable being peeled are washed away from the cutting blade by a stream of water parallel to the longitudinal axis of the peeling blade.

It is also an advantage of the present invention that the peeling blade is easily replaceable.

It is a further advantage of the present invention that the presence of a flow of water over the peeling blade provides a constant lubrication for the peeling blades that the peeling blade stays sharper for a longer period of time and peeling is easier.

Still another advantage of the present invention is that during peeling a constant flow of water is provided over the vegetable to clean the vegetable.

Yet another advantage of the present invention is that the adapter for attaching to the faucet is particularly designed to fit a variety of different faucets and to be easily attached and detachable.

Other features and advantages of the present invention are stated in or apparent from detailed description of the presently preferred embodiment of the invention found hereinbelow.

BRIEF DESCRIPTION OF THE DRAWINGS

FIG. 1 is a perspective view of the water cleaned vegetable peeler according to the present invention.

FIG. 2 is a an exploded perspective view of the bearing member and a portion of the peeling blade received therein.

FIG. 3 is a rear elevation view of the bearing member depited in FIG 2.

FIG. 4 is a partially cut away perspective view of the bottom half of the handle depicted in FIG. 1.

FIG. 5 is a rear cross-sectional view of the handle depicted in FIG. 5 taken along the line 5—5.

DETAILED DESCRIPTION OF THE PREFERRED EMBODIMENT

With reference now to the drawings in which like numerals represent like elements throughout the several views, a presently preferred embodiment of a water cleaned vegetable peeler 10 is depicted in FIG. 1. Vegetable peeler 10 includes a handle 12 from which a peeling blade 14 extends. As shown, peeling blade 14 is approximately semicircular in cross section with a central slot 16 therealong. Located on either side of central slot 16 are cutting edges 18 of peeling blade 14. As best shown in FIG. 2, peeling blade 14 further includes a mounting end 20 which has a substantially cylindrical cross section and which includes central aperture 22 therethrough.

Depicted in FIG. 2 is a bearing member 24 which is suitably mounted in a forward end 26 of handle 12. Bearing member 24 includes a cylindrical front end 28 having a bore 30 therein. Bearing member 24 also includes a cylindrical back end 32 having an extension 34 which is adapted to receive the proximal end of a resilient hose 36. Extension 34 is sized relative to the passage in hose 36 such that hose 36 is held on extension 34 by a tight friction fit. Extending through extension 34 in back end 32 is a bore 38. Bore 38 extends all the way to bore 30 in forward end 26.

Mounted between front end 28 and back end 32 are two oppositedly directed projections 40. As best shown in FIG. 3, projections 40 extend on either side of front end 28 of bearing mnember 24 for a purpose to be discussed subsequently.

As shown in FIG. 1, handle 12 includes a top portion 42 and a bottom portion 44. Top portion 42 and bottom portion 44 are substantially identical except for the peripheral mating areas where top portion 42 meets with bottom portion 44. As depicted in FIG. 5, it is seen that top portion 42 includes an outer lip 46 extending around the periphery of top portion 42 and mating with an inner lip 48 extending around the periphery of bottom portion 44.

As top portion 42 and bottom portion 44 are substantially identical, only bottom portion 44 will be described in detail. As shown in FIG. 4, bottom portion 44 includes a semicircular aperture 50 at a rearward end 52 of handle 12. Semicircular aperture 50 is sized slightly smaller than the diameter of hose 36 in order to securely hold hose 36 therein in conjunction with the similar semicircular aperture in top portion 42. In order to prevent hose 32 from being pulled from handle 12, hose 36 preferably includes a groove 54 which is trapped in semicircular aperture 50 when handle 12 is assembled.

Bottom portion 44 also includes a bottom half of a mounting means 56 for bearing member 24. Mounting means 56 includes a semicircular aperture 58 in forward end 56 which is sized to have the substantially same diameter as front end 28 of bearing member 24. Spaced inwardly from semicircular aperture 58 is a front semicylindrical bearing surface 60 which is built up from the interior of bottom portion 44. Front bearing surface 60 has a diameter substantially equal to the diameter of front end 28 of bearing member 24. Immediately behind front bearing surface 60 is an end surface 62. End surface 22 is spaced from forward end 26 of handle 12 a distance which is substantially equal to the length of cylindrical front end 28. With this construction, front end 28 of bearing member 24 is mounted in semicircular aperture 50 and front bearing surface 60 with the forwardmost end of front end 28 substantially flush with forward end 26 of handle 12 as shown in FIG. 1.

Mounting means 56 also includes back semicircular bearing surface 64 which is spaced rearwardly of end surface 62. Back bearing surface 64 has a diameter substantially equal to the diameter of back end 32 of bearing member 24. Back bearing suface 64 is similarly built up from bottom portion 44 of handle 12.

Extending between front bearing surface 60 and back bearing surface 64 is a left stop 66 and a right stop (not shown). Both left stop 66 and the right stop are conveniently formed by a stop surface 68 located between front bearing surface 60 and back bearing surface 64.

It should be appreciated that bearing member 24 is suitably received in mounting means 56 for oscillating motion about the longitudinal axis of bearing member 24. As explained above, front end 28 of bearing member 24 fits matingly in semicircular aperture 56 and front bearing surface 60 with end surface 62 abutting the rearward end of front end 28. In addition, back end 32 fits matingly in back bearing surface 64. In this position, projections 40 of bearing member 24 are located in the area between back bearing surface 64 and front bearing surface 60 with one projection 40 located above left stop 66 and the other projection located above the right stop under the side. It should be appreciated that the clearances between front bearing surface 60, back bearing surface 64, and semicircular aperture 58 is such that bearing member 24 is free to oscillate therein. However, bearing member 24 is not free to rotate as projections 40 contact left stop 66 (and the similar right stop in top portion 42) or the right stop (and the similar left stop in top portion 42) after a rotation of between 30 and 60 degrees, and preferably around 50 degrees. Thus, when bottom portion 44 is attached to top portion 42 to form handle 12, bearing member 24 is trapped in handle 12 and is capable of only an oscillating motion.

When bearing member 24 is mounted on mounting means 56, the proximal end of hose 36 is located around extension 34. The position of groove 54 along hose 36 is thus chosen so that hose 36 runs freely from groove 54 to a position fricitionally held about extension 34. Hose 36 forms a water supply means together with an adapter 70 to which the distal end of hose 36 is attached. Adapter 70 is preferably a funnel shaped, soft rubber push on device which is easily attached to a variety of faucet outlets.

In operation, vegetable peeler 10 functions in the following manner. Initially, it should be appreciated that vegetable peeler 10 is assembled with bearing member 24 located in mounting means 56 between top portion 42 and bottom portion 44 of handle 12. In addition, resilient hose 36 is attached at one end to extension 34 of bearing member 24 and at the other end to adapter 70. As thus assembled, vegetable peeler 10 is ready for use as soon as adapted 70 is suitably connected to a faucet outlet.

To commence use of vegetable peeler 10, with adapter 70 attached to a suitable faucet outlet, the faucet is operated to produce a flow of water through the passage to hose 36. From hose 36, the water flows through bores 30 and 38 in bearing member 24 and then into and out of central aperture 22 in mounting end 20 of peeling blade 14. As the water exits central aperture 22 in peeling blade 14, the water is directed along the longitudinal axis of peeling blade 14. Thus, as cutting edges 18 peel a suitable vegetable, the peels rise through central slot 16 and are washed away in the longitudinal direction of peeling blade 14 by the flow of water.

As the peeling of the vegetable occurs, it should be appreciated that bearing member 24 and hence peeling blade 14 mounted therein are free to oscillate relative to handle 12. As mentioned above, the extent of this oscillation is determined by projections 40 and the stops provided on stop surface 68 in mounting means 56. It should also be appreciated that each projection 40 has a pair of stops associated therewith which are located one in bottom portion 44 and one in top portion 42. Thus, projections 40 allow a rotation of bearing member 24 from the position where projections 40 contacts one associated stop to a position where projections 40 contacts the other associated stop. It should further be appreciated that hose 36 is sufficiently resilient or flexible so that the portion of hose 36 in handle 12 flexs or twists sufficiently and does not prevent the oscillation of bearing member 24 and peeling blade 14.

Although the use of water flowing along peeling blade 14 acts as a lubricant and thus helps to maintain the sharpness of cutting edges 18, cutting edges 18 will eventually become dull. At that time it is a simple matter to simply pull peeling blade 14 axially so that mounting end 20 is withdrawn from bore 30 in bearing member 24. A new peeling blade 14 is then substituted for the dull peeling blade by inserting the new mounting end 20 into bore 30 of bearing member 24.

After peeling of the vegetable is completed, adapter 70 is simiply grasped by the user and pulled from the faucet outlet. By holding adapter 70 uppermost, the water remaining in hose 36 is simply drained therefrom prior to storage of vegetable peeler 10.

Although the present invention has been described with respect to exemplary embodiments thereof, it will be appreciated by those of ordinary skill in the art that variations and modifications can be effected within the scope and spirit of the present invention.

I claim
1. A water cleaned vegetable peeler comprising:
a handle having a forward end and a rearward end;
a bearing member having a front end, a back end, and an aperture extending from said front end to said back end along a longitudinal axis;
a mounting means for mounting said bearing member for oscillating movement relative to said handle during use about said axis in said forward end of said handle;
an elongate peeling blade including a mounting end, said mounting end including an aperture therethrough and being adapted to fit in said aperture of said bearing member;
a water supply means for supplying water to said peeling blade through said aperture in said mounting end of said peeling blade, said water supply means including an adapter for attachment to a water faucet and a hose which is attached at one end to said adapter and at the other end to said back end of said bearing member in fluid communication with said aperture in said bearing member such that water supplied through said hose plays over said peeling blade to clean the blade.

2. A vegetable peeler as claimed in claim 1 wherein said mounting end of said peeling blade is received in only a portion of said aperture in said bearing member, and wherein the remainder of said aperture in said bearing membe is sized substantially the same a said aperture in said peeling blade.

3. A vegetable peeler as claimed in claim 1 wherein said mounting end of said peeling blade is sized substantially the same as a portion of said aperture in said bearing member in which said mounting end is received such that said mounting end of said peeling blade is frictionally held in the portion of said aperture and is thus easily replaceable.

4. A vegetable peeler as claimed in claim 1 wherein said back end of said handle includes an aperture through which said hose extends; and further including a means for preventing the hose from being pulled from said handle.

5. A vegetable peeler as claimed in claim 1 wherein said front end of said bearing member is cylindrical; wherein said back end of said bearing member is cylindrical; and wherein said mounting means includes a front cylindrical bearing surface in which said cylindrical front end of said bearing member is received, a back cylindrical bearing surface in which said cylindrical back end of said bearing member is received, and a stop means for limiting the oscillatory motion of said bearing element relative to said handle.

6. A vegetable peeler as claimed in claim 5 wherein said stop means is located between said front cylindrical bearing surface and said back cylindrical bearing surface.

7. A vegetable peeler as claimed in claim 6 wherein said stop means includes a projection on one of said bearing member and said mounting means and a pair of stops between which said projection is located on the other of said bearing member and said mounting means.

8. A vegetable peeler as claimed in claim 7 wherein said projection is mounted on said bearing member so as to oscillate therewith and said stop is mounted on said mounting means in said handle.

9. A vegetable peeler as claimed in claim 1 wherein there are two oppositely directed projections on said bearing member and two pairs of stops on said mounting means in which a respective said projection is located.

10. A water cleaned vegetable peeler comprising:
a handle having a forward end and a rearward end;
a bearing member having a front end, a back end, and an aperture extending from said front end to said back end along a longitudinal axis;
a mounting means for mounting said bearing member for oscillating movement relative to said handle during use about said axis in said forward end of said handle;
an elongate peeling blade including a mounting end, said mounting end being adapted to be received in said aperture of said bearing member to hold said peeling blade in said aperture; and
a water supply means for supplying water to said peeling blade through said aperture in said bearing member, said water supply means including an adapter for attachment to a water faucet and a hose which is attached at one end to said adapter and at the other end to said back end of said bearing member in fluid communication with said aperture in said bearing member such that water supplied through said hose plays over said peeling blade to clean the blade.

* * * * *